United States Patent Office 3,041,579
Patented June 26, 1962

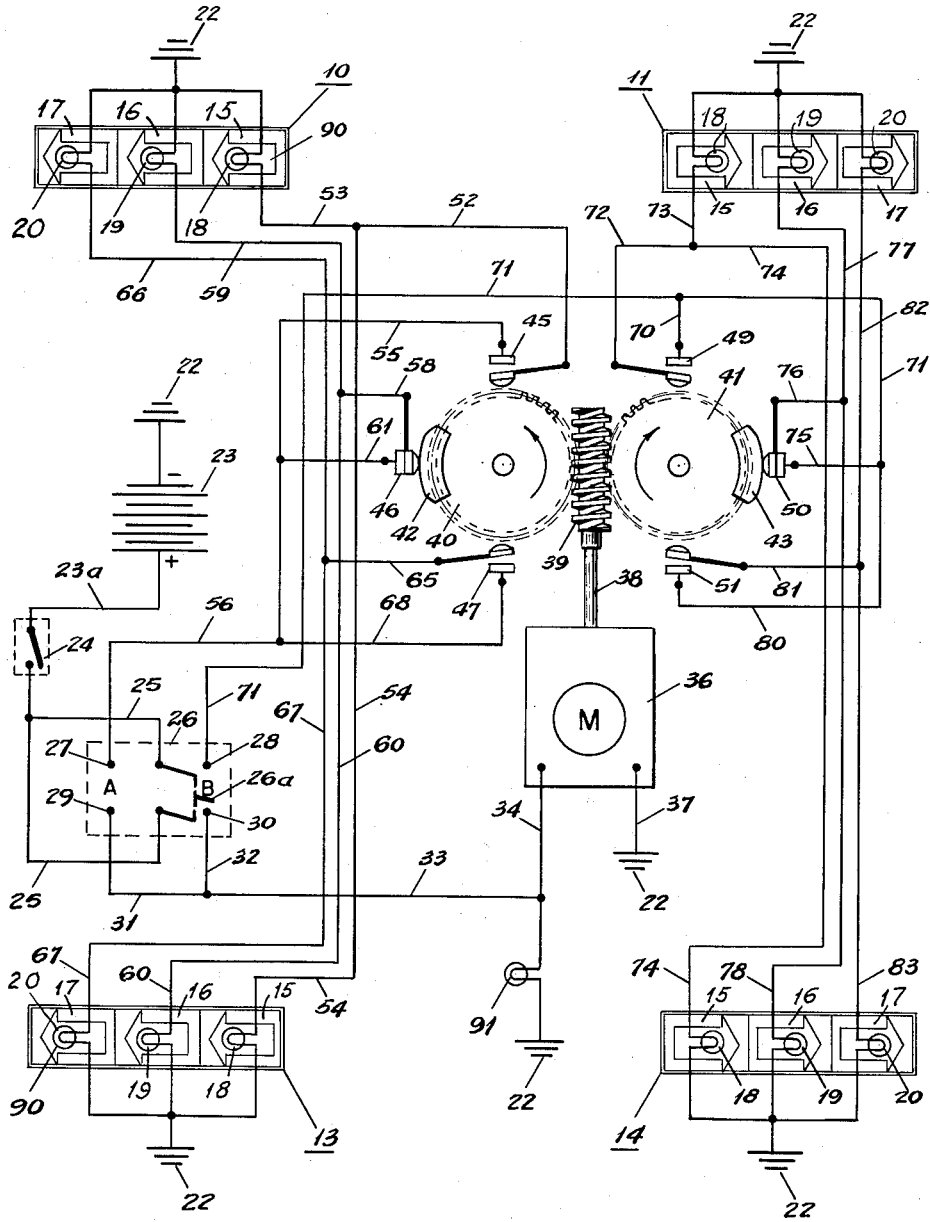

3,041,579
TURNING SIGNAL FOR MOTOR VEHICLES
Melvin J. Kanzenbach, 1504 N. Sycamore St.,
Tucson, Ariz.
Filed Jan. 26, 1959, Ser. No. 788,974
1 Claim. (Cl. 340—82)

This invention relates to turn signals for motor vehicles.

An object of the invention is to provide a turn signal for motor vehicles which shall indicate the direction in which the operator thereof proposes to turn.

Another object of the invention is to provide such a signal that will be easily visible, will plainly indicate the direction of the proposed turn, and will attract the attention of operators of other motor vehicles either meeting or following it, as well as that of pedestrians.

A further object of the invention is to arrange such a signal comprising an inexpensive, reliable system of electrically lighted lamps, which, by their successive lighting, will indicate the direction of a proposed turn by simulated, moving, illuminated arrows.

Other objects of the invention will in part be obvious and will in part appear hereafter.

While motor vehicle turn signals of the type which indicate the direction of turn by traversing light effects are known, they do have certain disadvantages. The primary disadvantage resides in their complicated construction which makes them expensive and difficult to maintain in operating condition. Also, the traversing light effect does not sometimes appear clearly to travel in the indicated direction of turn.

My invention overcomes these difficulties by providing a turn signal of simple construction employing a series of successively illuminated arrows which have the appearance of moving in the direction of the turn.

The invention will be more readily understood by reference to the drawing which shows a device according to the invention schematically.

Four banks of lights 10, 11, 13 and 14 may be mounted in suitable positions on a motor vehicle. For example, the banks 10 and 11 may each be mounted on the front fenders of a motor vehicle and the banks 13 and 14 on the rear fenders where they may be seen by approaching and following vehicles, respectively.

The banks 10, 11, 13 and 14 each comprises a shell, which may be made of sheet steel or any other suitable material, at least 12 inches long, 2 inches wide and 1½ inches deep which is divided into a plurality of compartments 15, 16, and 17, respectively, of equal size.

Single contact type lamps 18, 19 and 20 each may be mounted in the compartments 15, 16 and 17 of the banks 10, 11, 13 and 14, respectively. While the lamps 18, 19 and 20 may have any suitable strength, I find that lamps of from 3 to 6 candlepower are satisfactory.

A return circuit or ground 22, which may be the frame of the motor vehicle, is connected to one side of the filament of each lamp 18, 19 and 20. A power source or battery 23 may have its negative side connected to the ground 22 and its positive side to the poles of a double-pole, double-throw switch 26 through a lead 23a, a single pole, single throw switch 24, and leads 25. The switch 24 is preferably provided in the form of the ignition switch of the motor vehicle. Although not necessary to the operation of the turn signal, the switch 24 is employed to prevent operation of the signal when the ignition switch of the automobile is off. The switch 26 may have an actuating lever 26a mounted on the steering post of the vehicle the same as turn signal switches conventionally used.

The switch 26 has a side A including contacts 27 and 29 and a side B including contacts 28 and 30. The contacts 29 and 30 are both connected to a motor 36 through individual leads 31 and 32, respectively, and common leads 33 and 34. Thus, the motor 36 will be activated when the lever 26a is in either position A or B. The motor 36, which may be a small electric motor designed to operate on the same voltage as the motor vehicle electrical system, is connected to ground 22 through a lead 37 and includes a rotatable shaft 38. A suitable reduction gear, such as the worm gear 39 may be rigidly affixed to the shaft 38. Toothed gears 40 and 41 are rotatably mounted adjacent opposite sides of the shaft 38 in driving engagement with the worm gear 39. The motor 36 preferably rotates the gears 40 and 41 at 30 to 40 revolutions per minute.

Cams 42 and 43 are rigidly attached to the gears 40 and 41, respectively, near their peripheral edges. The cams 42 and 43 are made of any suitable non-conducting material and span an arc of about 80 degrees on the gears 40 and 41.

A first plurality of electrical contact assemblies 45, 46 and 47 are arranged to be contacted successively in rapid succession by the cam 42 as the gear 40 rotates in the direction of the arrow shown thereon. A second plurality of electrical contact assemblies 49, 50 and 51 are arranged to be contacted in a similar manner by the cam 43 when gear 41 rotates in the direction of its arrow. The contact assemblies may be of any conventional type which have stationary contacts and movable contacts. Of course it will be apparent to those skilled in the art that the stationary contacts will be resiliently mounted and the movable contacts will be adjustable to prevent contacting the teeth of gears 40 and 41. The movable contacts are mounted in any suitable manner, not shown, in a circle adjacent each gear 40 and 41 in the path of travel of the cams 42 and 43 and are so positioned that the cams 42 and 43 will contact and move them against their respective stationary contacts as the gears 40 and 41 rotate. The contact assemblies 45 and 46 may be located about 90° apart, 46 and 47 about 90° and 47 and 45 about 180° apart. Likewise, the contact assemblies 49 and 50 may be located about 90° apart, 50 and 51 about 90° apart and 51 and 49 about 180° apart.

When the contact assembly 45 is closed by cam 42, a circuit is completed through the lamps 20 in each of the banks of lights 10 and 13, respectively, from the contacts 45 to the contact 27 of switch 26 through electrical lines 52, 53, 54, 55 and 56; when the contact assembly 46 is closed by cam 42 a circuit is completed through lamps 19 in each of the banks of lights 10 and 13, respectively, from the contacts 46 to contact 27 through electrical lines 58, 59, 60, 61 and 56; and a circuit through the lamps 18 in each of the banks 10 and 13 is completed between the contacts 47 and contact 27 through electrical lines 65, 66, 67, 68 and 56 when the contact assembly 47 is closed by the cam 42.

Similarly, circuits will be completed from contact 28 of switch 26 through the contact assemblies 49, 50 and 51 to the lamps 18, 19 and 20 of banks 11 and 14 through electrical lines 70, 71, 72, 73 and 74; 75, 71, 76, 77 and 78; and 80, 71, 81, 82 and 83, respectively, when the appropriate contacts are closed by the cam 43. The banks of lamps 10 and 11, which are mounted on the front of the motor vehicle, may be covered with white or amber colored lenses, not shown, and the banks 13 and 14, which are mounted on the rear fenders, may be covered with red lenses, not shown. The lenses, in turn, may be held in place by means of opaque covers having arrow-shaped openings 90 cut therein. An arrow-shaped opening 90 is positioned over each of the compartments 15, 16 or 17 in the banks 10, 11, 13 and 14. Consequently, the arrows 90 are illuminated by the respective lamps 18, 19 and 20.

An indicator lamp 91, which may be mounted on the instrument panel of the vehicle, not shown, has one side of its filament connected to the ground 22 and the other side of its filament connected to the contacts 29 and 30 through lead 33 and leads 31 and 32, respectively.

Operation of the device will be readily understood. When the ignition switch 24 is closed and the actuating lever 26a of switch 26 is moved to position A so that the poles of switch 26 contact electrical contacts 27 and 29, a first circuit is completed from the battery 23 to the motor 36 and the indicator lamp 91 through lead 23a, switch 24, one lead 25, one pole of switch 26, contact 29, and leads 31, 33 and 34. Power from the battery 23 will now operate the motor 36 and the lamp 91. As the motor 36 operates, the shaft 38 will rotate and turn each gear 40 and 41 in the direction of its arrow causing the cams 42 and 43 to successively close the contacts 45, 46 and 47; and 49, 50, and 51, respectively, each for a fraction of a second.

Simultaneously, circuits are completed from the power source 23 to the stationary portions of contact assemblies 45, 46 and 47 through lead 23a, switch 24, the other lead 25, the other pole of switch 26, and contact 27; then through (1) leads 56 and 55 to the stationary portion of contact assembly 45; (2) leads 56 and 61 to the stationary portion of contact assembly 46; and (3) leads 56 and 68 to the stationary portion of contact assembly 47.

As the cam 42 closes contact assembly 45 for a fraction of a second, a first circuit is completed from the contact 45 to the lamp 20 in compartment 17 of bank 10 through electrical lines 52 and 53 and a second circuit will be completed from the contact assembly 45 to lamp 20 in compartment 17 of bank 13 through electrical lines 52 and 54. This will light both lamps 20 simultaneously for a fraction of a second until the cam 42 leaves contact assembly 45 and moves on to close contact assembly 46. The closing of contact 46 completes a first circuit from the contact 46 to the lamp 19 in the compartment 16 of bank 10 through electrical lines 58 and 59 and a second circuit will be completed from the contact 46 to the lamp 19 in compartment 16 of bank 13 through lines 58 and 60. This will light both lamps 19 simultaneously for a fraction of a second until the cam 42 leaves contact 46 and moves on to close contact assembly 47, whereupon circuits will be completed through appropriate electrical lines to illuminate both lamps 18 in banks 10 and 13 for a fraction of a second. This completes one cycle of successive illumination of the lamps in banks 10 and 13 and one revolution of the gear 40.

The length of the period of illumination of each lamp is based on the speed of the cam 42 and the 80 degree arc of the cam 42. The interval of time between the illumination of successive lamps in each bank during a cycle is controlled by the speed of the gear 40, the length of the arc of the cam 42 and the distance between contact assemblies 45, 46 and 47. Since the gear 40 rotates at between 30 and 40 revolutions per minute and there is only 10 degrees to be traversed by the leading edge of the 80 degree cam from the instant the trailing edge leaves one contact assembly until the leading edge contacts the succeeding contact assembly, which is spaced 90 degrees from the preceding contact, a very short interval elapses between the extinguishment of a preceding lamp and the illumination of a succeeding lamp during a particular cycle. However, since there is 180 degrees between the third set of contacts 47 and the first set 45, intervals of time between cycles will be much longer than the interval between illumination of successive lamps in the cycle. This timing arrangement increases the illusion that the arrows 90 are moving from the inboard side to the outboard side of the banks 10 and 13 and comes to the attention of oncoming or following vehicles much quicker than a single flashing light. Also, the anticipated direction of turning is unmistakable. The above described cycle continues until the lever 26a is returned to its neutral position.

Since it is apparent that the cycle described above will take place in banks 11 and 14 through appropriate circuits when the lever 26a is moved to the position marked "B" on switch 26, the details of such cycle will not be described herein.

It will be seen that I have invented a new and useful turn signal for motor vehicles which is easily visible, is inexpensive and reliable and indicates the direction of proposed turn by simulated, moving illuminated arrows.

The embodiment of the invention shown and described herein can be modified without departing from the spirit and scope of the invention. Accordingly, it is to be understood that I do not wish to be limited by the exact details of construction shown and described herein for purposes of exemplification, but not of limitation.

I claim:

A direction signal for motor vehicles comprising a plurality of signal compartments arranged in a row, a light source in each compartment, a translucent arrow covering each compartment, and means for sequentially energizing said light sources from compartment to compartment for predetermined periods of time from end to end of said row, said last mentioned means including a rotatably mounted cam, an electrical contact assembly for each lamp mounted in the path of travel of said cam and adapted to be closed by said cam, the distance between successive contacts being equal means for rotating said cam, and electrical distributing means for distributing electrical energy to said light sources through said contact assemblies, characterized in that the distance between the last contact assembly and the first contact assembly in said path of travel is substantially greater than the distance between successive contact assemblies in said row.

References Cited in the file of this patent

UNITED STATES PATENTS

| | | |
|---|---|---|
| 479,673 | Smith et al. | July 26, 1892 |
| 1,324,923 | Pfeifer | Dec. 16, 1919 |
| 2,431,129 | Levingston | Nov. 18, 1947 |

FOREIGN PATENTS

| | | |
|---|---|---|
| 433,046 | Germany | Aug. 23, 1926 |
| 374,523 | Great Britain | June 16, 1932 |
| 623,058 | France | Mar. 14, 1937 |

OTHER REFERENCES

Publication: "Illuminating Engineering," May 1940, pages 424, and 426.